United States Patent [19]

Nolf

[11] 4,400,579

[45] Aug. 23, 1983

[54] BRANCH-OFF ASSEMBLY

[75] Inventor: Jean-Marie E. Nolf, Hamme-Mille, Belgium

[73] Assignee: N.V. Raychem S.A., Kessel-lo, Belgium

[21] Appl. No.: 162,406

[22] Filed: Jun. 21, 1980

Related U.S. Application Data

[62] Division of Ser. No. 973,614, Dec. 27, 1978, Pat. No. 4,298,415.

[51] Int. Cl.³ .............................................. H01R 13/46
[52] U.S. Cl. .......................... 174/854 R; 174/DIG. 8; 174/92; 156/85; 156/86
[58] Field of Search .................. 174/DIG. 8, 92, 84 R, 174/71 R, 72 R, 75 F, 73 R, 75 R, 77 R, 88 R

[56] References Cited

U.S. PATENT DOCUMENTS 3,455,336  7/1969  Ellis ............................ 174/DIG. 8
4,085,286  4/1978  Horsma et al. .................... 174/92
4,123,047 10/1978  Koht et al. .................. 174/DIG. 8

FOREIGN PATENT DOCUMENTS 2413623 10/1975  Fed. Rep. of Germany .
  45099 10/1976  United Kingdom .

Primary Examiner—Roy N. Envall, Jr.
Attorney, Agent, or Firm—Lyon & Lyon

[57] ABSTRACT

A branch-off seal between a heat-recoverable sleeve, such as a tubular or wrap-around sleeve made from cross-linked polymeric material, and two or more substrates such as electrical cables is effected by using one or more clips the outer legs of which are positioned over the outer surface of the sleeve so as to form as appropriate number of conduits and applying heat to cause the sleeve to shrink about the substrates positioned within the conduits. The preferred clips are formed as a trident, the central leg of which extends into the heat-recoverable sleeve and is provided with a layer of a hot-melt adhesive or another sealant so as to enhance the seal formed at the branch-off.

81 Claims, 50 Drawing Figures

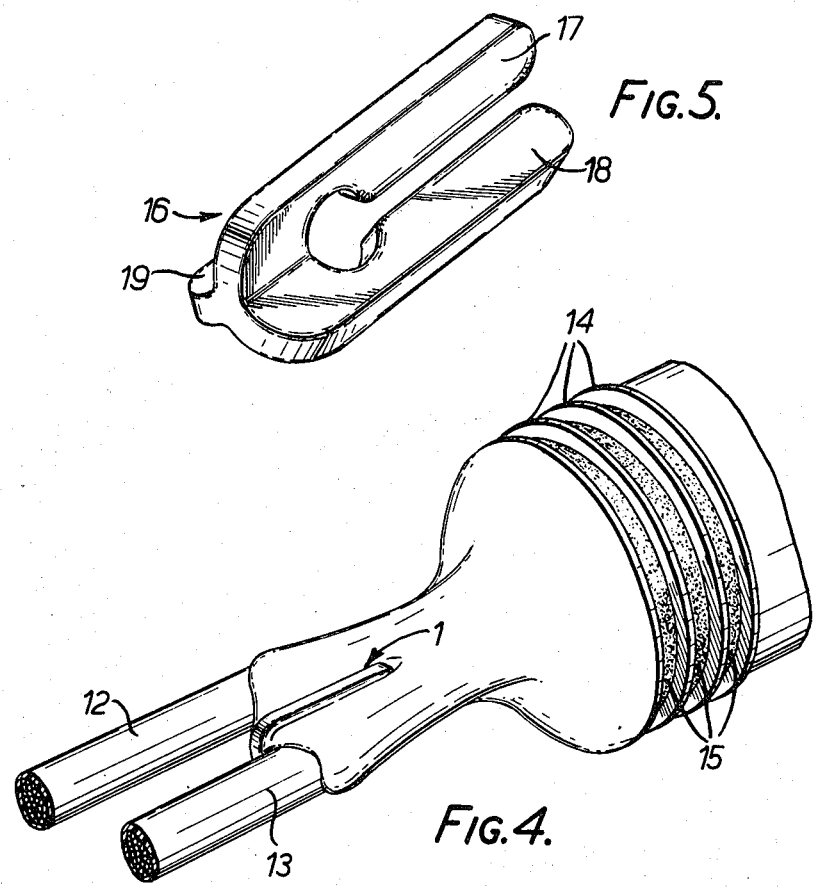
FIG. 5.
FIG. 4.
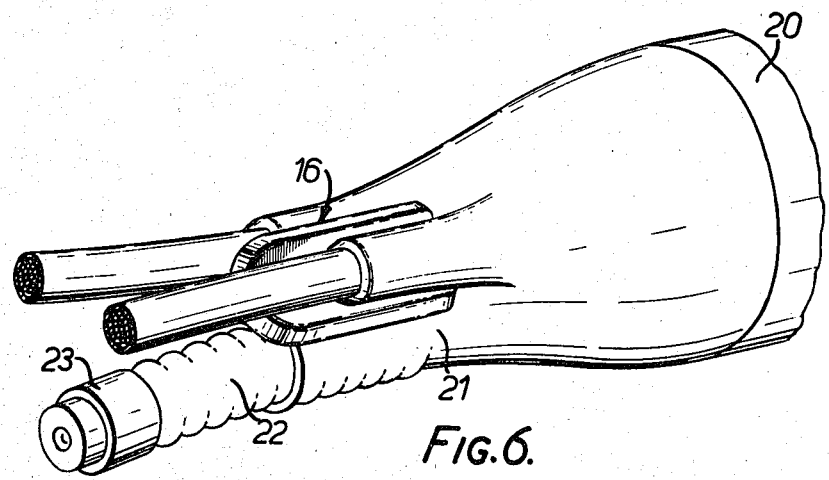
FIG. 6.

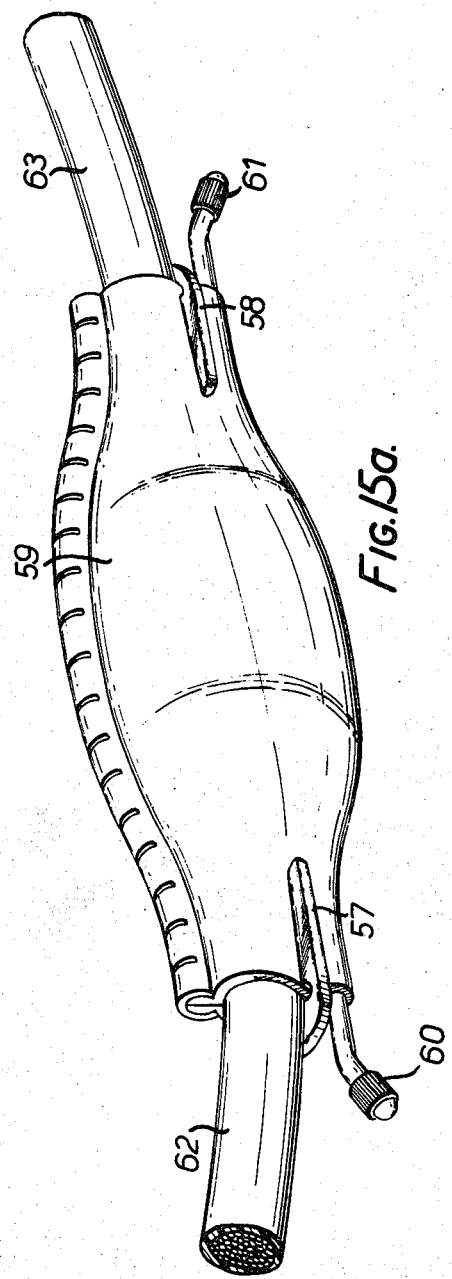
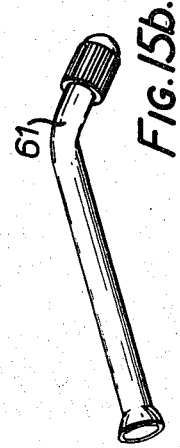
Fig. 15a.
Fig. 15b.

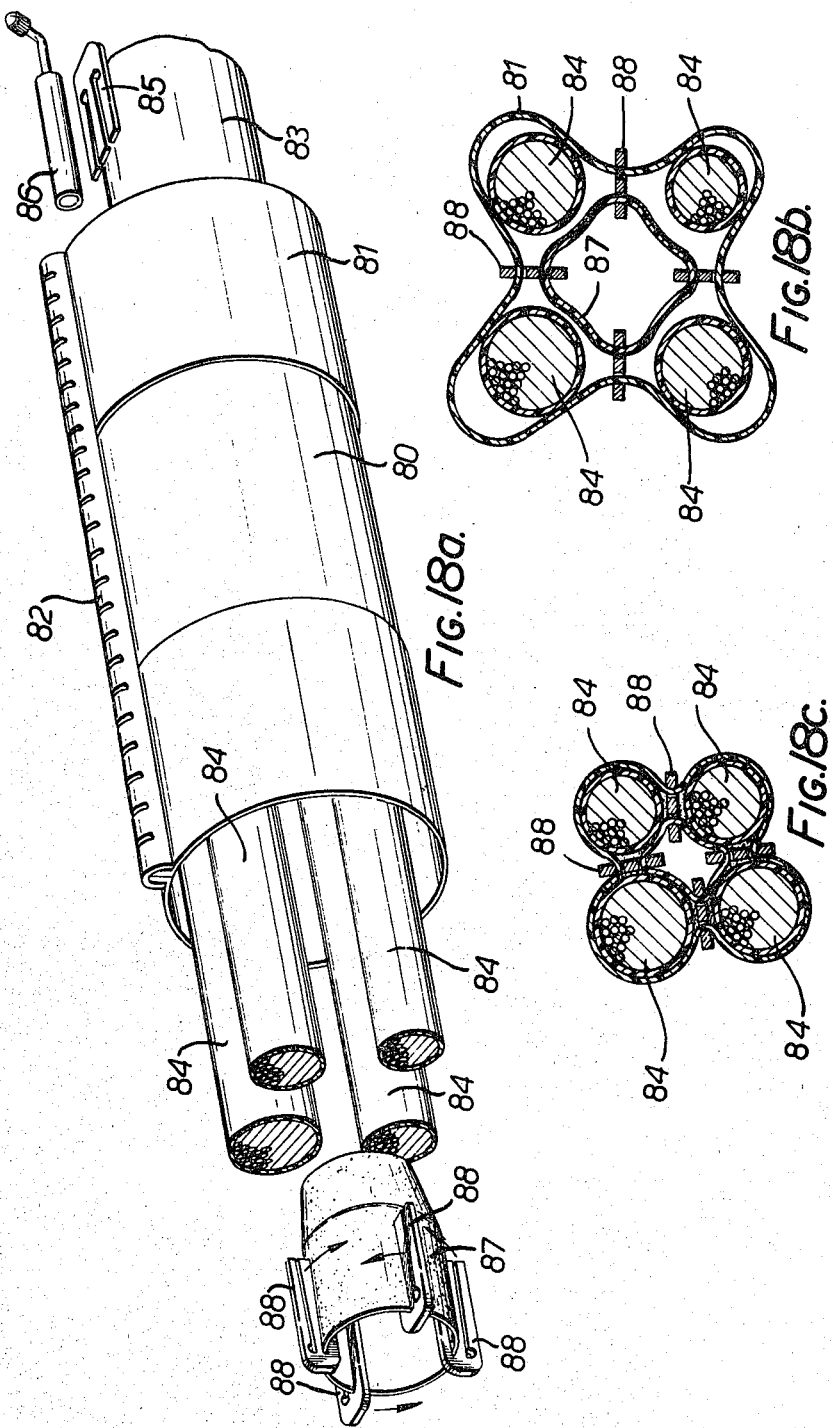

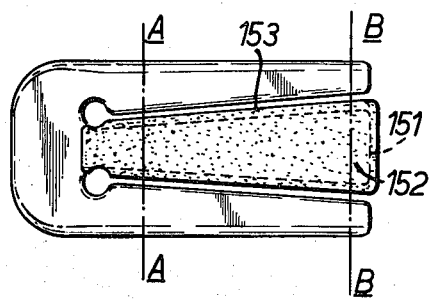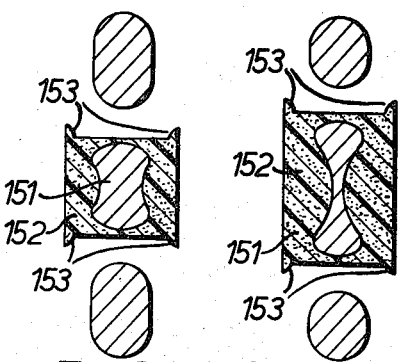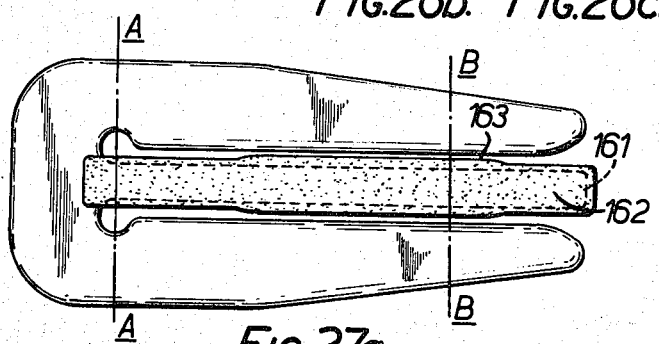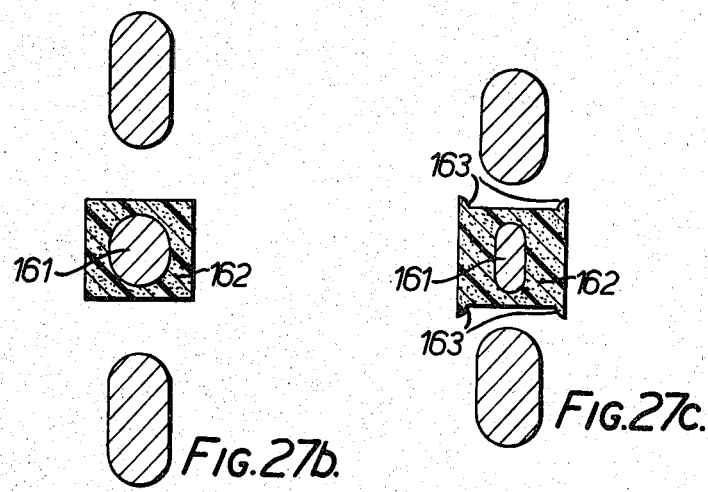
FIG.26a. FIG.26b. FIG.26c. FIG.27a. FIG.27b. FIG.27c.

BRANCH-OFF ASSEMBLY

This is a division, of application Ser. No. 973,614, filed Dec. 27, 1978 now U.S. Pat. No. 4,298,415.

This invention relates to heat-recoverable articles and their use in the insulation and protection of substrates such as supply lines.

Heat-recoverable articles, especially heat-shrinkable articles, are now widely used in many areas where insulation, sealing and encapsulation are required. Usually these articles recover, on heating, towards an original shape from which they have previusly been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wires, cables and pipes. However, there are other applications where it is desirable to provide a connecting, insulating or protective heat-recoverable member for elongated objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218 and British Pat. Nos. 1,155,470; 1,211,988 and 1,346,479. In other applications, however, the sheet may be held in the wrapped-up configuration during recovery by means of an adhesive which may, in some cases, be applied on site.

Heat-recoverable sleeves and wrap-around sleeves have been successfully employed in many fields of application. However, problems may arise when two or more substrates such as supply lines, for example cables or pipes, have to be sealed at one position. This problem, which is known as "branch-off", may occur, for example, at the outlet of a heat-recoverable part. Amongst areas in which this problem is typically encountered there may especially be mentioned the outlets of the splice cases described and claimed in British Pat. No. 1,431,167, the feed-through devices described and claimed in British Pat. No. 1,245,119 and the duct seal devices described and claimed in British Patent Application No. 45725/76.

One effective solution for tubular sleeves has been to use moulded heat-shrinkable parts provided with preformed outlets for the individual supply lines. However, in general such moulded parts have to be made to suit a specific application. Their versatility has been improved by the use of end caps which seal outlets which are not needed in a specific operation, as described and claimed in German Offenlegungsschrift No. 2,748,383, but they are nonetheless expensive and thus their use becomes economically infeasible in many routine applications.

Another, less expensive, solution which has frequently been employed is to use mastic tape to seal the gap between the supply lines so that, on recovery, a proper encapsulation is formed at the end of the heat-recoverable part. However, the use of such tape requires skill on the part of the installer and the method is not applicable to large parts. In addition, the mastic may degrade the overall performance of products which are provided with an inner lining or coating of a hot-melt adhesive.

The present invention is based on the surprising discovery that an effective branch-off at the end of a heat-recoverable part can be obtained by forming the individual outlets by means of a suitably shaped clip made from a relatively rigid material.

Accordingly, the present invention provides a method of forming a branch-off seal between a heat-shrinkable sleeve and at least two substrates such as supply lines, which comprises the steps of (a) positioning a clip having at least two elongate legs over the outer surface of the heat-shrinkable sleeve at the end thereof so as to form at least two terminal conduits;

(b) positioning the substrates within the conduits; and (c) applying heat so as to effect shrinkage and to form the desired seal.

It will be appreciated that steps (a) and (b) may be effected in any order or simultaneously. For example, in many cases the clip will be pushed into place after the sleeve has been positioned about the substrates.

The present invention also provides clips suitable for use in the above method.

Whilst it has been proposed to use clips and other clamping devices in connection with heat-shrinkable products, it has never before been proposed to use a clip, as in the present invention, to form two or more outlets from a heat-shrinkable sleeve and maintain them against the recovery forces of the sleeve. Thus, whilst Belgian Patent 833,916 proposes to provide clips between the outlets of a splice case, it specifically states that heat-recoverable surfaces should not come into contact with each other and, for this reason, in preferred embodiments, forms the operative part of the splice case from a heat-recoverable upper part positioned on a non-heat-recoverable lower part which is provided with a ridge or finger to prevent contact of the heat-recoverable material with itself as it passes round a cable. In addition, the material of the heat-recoverable upper part is not deformed, except around the cables, so that the clips, which are positioned between the cables, do not enclose any heat-recoverable material and thus are not subjected to any recovery forces which might tend to deform them; this is stated to be an advantage.

Similarly, whilst German Offenlegungsschrift No. 2,413,623 proposes to use a U-shaped clip in conjunction with a heat-recoverable branch-off, the clip is not employed until after shrinkage and is designed to be positioned over an X-shaped insert member which is positioned inside the heat-recoverable sleeve between adjacent cables.

The methods using clips in the prior art are, therefore, completely different from the method using them in the present invention.

In its simplest form the clip used in the present invention is U-shaped and its two legs are slid over the outer surfaces of the pinched together heat-recoverable sleeve or wrap-around sleeve, or over the surfaces of the heat-recoverable sleeve or wrap-around sleeve and another co-operating surface, which may itself be part of another heat-recoverable component, to form the conduits at one end of the sleeve. It is surprising that such a clip does not "milk-off" during recovery. Of course, the clip must be sufficiently long, especially if the substrates are large, but a suitable length can readily be ascertained by simple tests, and resistance against milk-off can be increased, if desired, by providing sawtooth or sinusoidal surfaces on the legs of the clip but, in general, this will not be necessary.

Another way in which milk-off can be avoided is to apply heat to the clip and the heat-recoverable material in the vicinity thereof before effecting total recovery. This local heating step results in a local increase in thickness of the heat-recoverable material and enhances the gripping action of the clip. In addition if, as in preferred embodiments, the sleeve or wrap-around sleeve is provided with an inner coating of an adhesive, the adhesive flows and thus ensures that a satisfactory bond is formed in the vicinity of the clip prior to recovery about the substrates. Such a local heating step may advantageously be employed with all forms of clip used in the present invention.

In further preferred embodiments of the present invention, as described in more detail hereinafter, the clip itself is constructed so as to obviate the problem of milk-off and may, for this purpose, be adjustable so as to conform to the requirements of any situation.

The clip used in the present invention is advantageously made from a thermally conductive material and/or is so constructed that it facilitates the application of heat to the heat-recoverable material in its vicinity (for example, it may be constructed as described and claimed in German Offenlegungsschrift No. 2756021). However, in other instances, the heat-recoverable sleeve may be provided with internal or self-contained heating means, in which case the clip may be made from a non-thermally conductive material.

For this and other reasons the clip is preferably made from a metal including, for example, steel copper, brass, beryllium copper, and, especially, aluminium. An aluminium clip may be made, for example, by mould injection possible followed by a deburring operation to remove sharp edges; a steel clip may be made by stamping followed, if necessary, by a similar deburring operation. In many applications it will be desirable to protect the clip against corrosion, for example, an aluminium clip is preferably given a black anodization treatment or is provided with a chromate layer which may itself be protected against mechanical damage by, for example, an epoxy resin coating. Such a coating may further provide electrical insulation, for example where two lead-jacketed cables are involved.

The significance of the function of the clip in the transference of heat to and away from the heat-recoverable material and adhesive in its vicinity is another factor not appreciated in the prior art. Thus, whilst Belgian Patent 833,016 mentions that a clip may be made from metal, it also mentions many other non-thermally conductive materials, such as plastics which would not, in general, be suitable in the present invention, its preferred material being a glass filled polyamide. German OS No. 2,413,623 does not mention the material from which the clip is made.

In certain applications, the metal of the clip may be a memory alloy, for example one of the nickel-titanium alloys described in U.S. Pat. Nos. 3,174,851; 3,351,463; 3,753,700 and 3,759,552 or a beta-brass alloy as described in U.S. Pat. Nos. 3,783,037 and 4,019,925. In such instances the clip itself may be heat-recoverable so that the legs of the clip move towards each other when the assembly is heated to effect shrinkage of the sleeve. (Alternatively, the clip may be heat-recovered before or after said step.) Preconditioned memory alloys, especially beta-brass alloys, are preferred for use in this aspect of the present invention. Such alloys and methods for preconditioning them are described and claimed in U.S. Pat. Nos. 4,036,669; 4,067,752 and 4,095,999.

In other embodiments the clip may be made from a resilient metal such as spring steel or beryllium copper and may exert resilient forces to enhance the seal formed. Thus resiliently deformed outer legs may be "held out" for example by hot melt adhesive so that they spring together on heating.

Whilst the simplest form of clip used in the present invention is generally U-shaped, it will be appreciated that its configuration may be varied from application to application. For example, in some applications it may be necessary to form more than two outlets at the end of the heat-recoverable component. This may be done by providing two or more simple U-shaped clips between the outlets or, in another arrangement, a single clip may be employed, such a having three or more legs so that each adjacent pair of arms acts as a simple U-shaped clip. These, and other configurations, fall within the scope of the present invention.

In one especially preferred embodiment of the present invention the clip is formed as a trident and the central leg of the trident passes into the heat-recoverable sleeve whilst at least one of the outer legs passes outside it. In this way a layer of heat-recoverable material is pinched between the central leg and the outer leg. In such a clip the inner surfaces of the outer legs preferably taper inwardly, so that the gap between the outer legs is greater at the open end of the clip than at the base of the gap. The surfaces of the central leg are also preferably tapered so that they run substantially parallel with the inner surfaces of the outer legs. Such an arrangement facilitates the positioning of the clip on the sleeve, which is especially useful for large diameter sleeves, and, once the clip is positioned in the heat-recoverable sleeve, milking-off becomes practically impossible, especially after recovery. It will be appreciated that with such a clip the inner surfaces of the heat-recoverable sleeve do not come into contact in the vicinity of the clip and the central leg of the clip acts to separate the two conduits which are formed. For this reason the central leg is preferably provided on each side with a layer of a hot-melt adhesive or another heat-activatable sealant, which flows during recovery to seal the gap between the conduits and thus ensures that the substrates within the conduits do not come into contact.

The sides of the central leg are, therefore, preferably roughened or contoured to facilitate adhesion and, also, to ensure the adhesive remains in the area of the clip on heating. An especially preferred clip has a waffled pattern on the surfaces of the central leg.

The outer legs of the clip are preferably provided with a thermochromic indicator. The reason for this is that when heat is applied to the clip, there may be a temperature difference of as much as 20° C. between the outer legs and the central leg. The use of a thermochromic indicator (such as, for example, a system using the melting of white polypropylene powder in a suitable binder) ensures that the operator applies sufficient heat to cause the hot-melt adhesive on the central leg to melt and flow.

The clip may, of course, be provided with other means for indicating that a desired temperature has been reached. For example, a resilient member such as a spring having an indicator element attached thereto, may be held in a biased position by a hot-melt adhesive so that, when the adhesive melts, the spring resiliently recovers causing the indicator element to move and thus signify that the desired temperature has been achieved.

Similarly, the clip may be provided with means for indicating that pressure seal has been safely achieved. In one preferred embodiment means are provided for indicating both that the desired temperature has been achieved and that there are no leaks in the seal at the outlet(s) of, for example, a pressurized splice case. In such an embodiment a indicator element may be held in a fixed position by a hot-melt adhesive but may be caused to move when the adhesive melts by the pressure built up inside the sealed joint; if the indicator does not move, either the adhesive has failed to melt, i.e. the required temperature has not been reached, or else the pressure has failed to reach the required level because of a leak in the seal formed on recovery. In a simple device of this sort, the hot-melt adhesive (or another thermofusible material) may itself act as the indicator, being extruded from the clip when the pressure builds up inside the joint.

The present invention accordingly also provides a clip for use in the method described above, said clip comprising two or more outer elongate legs and at least one central leg, the inner edges of the outer legs and the edges of the central leg forming channels for the insertion of heat-recoverable sheet material between the outer legs and the central leg and at least part of the surfaces on both sides of the central leg being provided with a heat-activatable adhesive or sealant and, as described above, these surfaces of the central leg being preferably roughened or contoured.

In certain applications, especially in the formation of branch-offs from pressurized splice cases and/or with cables of 30 mm diameter or more (e.g. from 35 to 80 mm), it may be advantageous for the inner edges of both outer legs and the edges of the central leg to lie in a mutually parallel arrangement.

However, in many applications, as described before, it will be preferable for the inner edges of the outer legs and the edges of the central leg to taper inwardly towards the closed base of the clip. Such a clip has certain advantages. First of all, the tapering of the inner edges of the outer legs and the edges of the central leg provides two sloping channels, so that when the clip is slipped on to the sleeve it is virtually locked in position. It will be appreciated, however, that once again, on shrinkage the heat-recoverable material thickens and further tightens the clip to the sleeve. Another advantage is that by correct choice of the angle defined by the outer legs and correct choice of the maximum width of the central leg, it is possible to tailor the clip to conform with the substrates. In this respect it may also be preferable for the central leg to be longer than the outer legs. In this way the required seal between the branch conduits formed is facilitated.

Other ways in which the clip may be shaped to conform with the substrates and thus, for example, to reduce the risk of adhesion failure are to provide concave outer surfaces on the central leg of the clip to accommodate small sized cables; (e.g. of from about 8 mm to 35 mm diameter) and to provide a central leg of lesser thickness, at least over part of its length, to accommodate large size cables (e.g. of diameter greater than about 30 mm, typically from 35 to 80 mm).

Once the hot-melt adhesive has flowed to fill the gap between the conduits, it will not be possible to remove the clip without causing the sleeve to become disbonded from the substrates. Thus there is no danger of the clip slipping off and leaving the branch-off division liable to failure by peel.

It will be appreciated that the trident clip may be adapted to multi-outlet branch-off arrangements in the same way as the simple U-clip and, in some instances, it is even possible to construct a clip which is adjustable according to the direction required by the conduits. In some multi-outlet clips it may be appropriate to form the central leg as a solid or hollow generally conical member co-operating with a plurality of outer legs. Similarly, as in the simple U-clips, the base of the gaps in the trident clip may be cut away to provide extra strength, in which case the thickness of the adhesive coating must be such as to provide sufficient material to fill these gaps on recovery. A typical range of hot-melt adhesive thickness on each side of the central leg is from 2 to 5 mm, but the thickness may, if desired, be varied along the length of the leg, it being greater at the open end of the clip than at the base. As mentioned above, the surface of the central leg is preferably rough or is corrugated or waffled to provide a seat for the adhesive and also to ensure that, on recovery, adhesive is not forced away from the central leg but, rather, is forced into the surface irregularities. In these and other embodiments of the present invention it may be advantageous to pigment the hot-melt adhesive so that its diffusion into and coalescence with the clear hot-melt lining of the sleeve may be noted to indicate that sufficient heating has occurred.

A further design modification concerning the provision of a hot-melt adhesive layer on the central leg is to provide it with one or more upper and/or lower longitudinal ridges over at least part of the length of the central leg to enhance the initial push-fit force of the clip on a sleeve and thereby to facilitate secure positioning of the clip on relatively thin expanded coated sleeves.

The strength of the clips used in the present invention is enhanced when they are made from flat stock, that is to say, when the width of the legs extending above and below the heat-recoverable sleeve is greater than their thickness in contact with the sleeve. Typically, the width will be from 1.5 to 3 times the thickness.

In some especially preferred embodiments of the present invention, one or more of the legs of the clip, especially the central leg, may be used to fulfil a secondary function. For example, the central leg may be hollow and act as an inlet or outlet for compressed air, as in a pressurised splice case, or for jelly, epoxy resins or foam materials, etc. The leg may, of course, be provided with a valve for such a purpose. In some of these embodiments the leg may itself act as a substrate. For example, a branch-off may be made from a single cable using such a clip specifically to provide an inlet valve.

In other embodiments, the clip may be provided with means for ensuring that electrical continuity is maintained between, for example, shielded cables positioned within the conduits. Such means may comprise, for example, jaws or similar members positioned on one or more of the legs of the clip and adapted to receive and grip tags cut from or attached to the shielding of the cables.

Whilst, in general, it is not contemplated that the clips will be used in conjunction with other members it is possible that in some cases it may be advantageous to provide a co-operating insert member and/or to use the method of the present invention in conjunction with other methods including, for example, the mastic tape method referred to above. In certain instances it may also be advantageous to use the clip to connect the heat-recoverable sheet material to another component. For example, a plurality of clips may be used to form branch-offs around a distribution box or to form a large number of branch-offs from a single splice case by using a further heat-recoverable component such as a cap positioned internally of the heat-shrinkable sleeve. Such embodiments are explained in more detail hereinafter.

It will be appreciated that the heat-recoverable sleeve may be a wrap-around sleeve and/or may comprise a closed end, i.e. it may be an end-cap, or may be part of a larger article, for example a larger heat-recoverable article, and that, in any case, the present invention is not in any way limited to the size or configuration of the heat-recoverable component. For example, the heat-shrinkable sleeve may be formed from two (or more) sheets of heat-recoverable material. All that is necessary for the purposes of the present invention is that the heat-shrinkable component has a hollow terminal portion within which the substrates are positioned.

When the clips are used in conjunction with a wrap-around sleeve it may be advantageous to form the clip so that it can co-operate with the fastening means of the wrap-around device. In some instances it may even be possible to form the clip as part of said fastening means.

Whilst, the clip will be held securely in position by the heat-recoverable sleeve and, in some embodiments, may be made adjustable so that the gap between the legs can be altered according to the thickness of the sleeve so as further to facilitate the formation of a secure grip upon recovery, it may, in certain applications, be advantageous to provide the clip with one or more members which co-operate with the substrates externally of the heat-recoverable sleeve so as to facilitate the correct positioning of the clip. For example a clip may be provided with a ring member which is adapted to surround a pressure transducer externally of a heat-shrinkable splice case joint. In another embodiment a clip may be provided with metal straps which can be fastened around heavy cables as they leave a joint so as to provide strain relief for the joint.

The heat-recoverable material may be any of the polymers known from the art to be useful for the production of heat-recoverable articles. Generally the sheet material will be of constant composition throughout; however laminates of two different polymers bonded or fused together may be used in certain instances. Amongst suitable polymers there may be mentioned, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or glassy polymer such as an olefin polymer. All of the above materials may, if desired, be cross-linked for example by irradiation and/or chemical means.

As mentioned above, the internal surface of the heat-recoverable component will, in general, be provided with a coating of an adhesive or a sealant such as a hot-melt adhesive or a mastic. Especially suitable hot-melt adhesives include, for example, polyamides, ethylene/vinyl acetate copolymers and terpolymers (with or without incorporated waxes) and polyesters. Such materials are described, for example, in British Pat. No. 1,440,810 and German OS No. 2,709,717. Also suitable are curable adhesives which melt and flow on heating but which will not afterwards be hot-meltable. There may also be mentioned epoxy resins and conventional mastics such, for example, as those based on butyl ad isobutylene rubbers modified with suitable materials known in the art. Obviously the use or otherwise of such materials and their type, if chosen, will depend upon the particular requirements in any given case.

In most applications the force exerted on the clip will lie in the range of from 5 to 15 kg, depending on the diameter of the substrate and the wall thickness and the degree of unresolved recovery of the sleeve. It will be appreciated in this latter respect that, as compared with the mastic tape method, the heat-recoverable sleeve will be required to shrink less and, therefore, have a smaller expansion ratio, because the clip forces the sleeve to conform to the circumstances of the cables in the central region, whereas in the mastic tape method the sleeve does not come into contact with the cables in this region. Of course, the degree of expansion required for the sleeve is lower when a trident clip is used than when a simple U-clip is employed.

It will be appreciated that the present invention provides a very simple method of making a satisfactory branch-off, thus removing any need for skillful installation and providing a consequent decrease in cost. The elongate legs of the clip ensure that a seal is formed from the edge of the heat-recoverable materials to the ends of said legs, thereby satisfactorily separating the substrates throughout that region.

Various embodiments of the present invention will now be described, by way of example only, with reference to the accompanying drawings, in which:

FIG. 4 shows another use for the clip;

FIG. 5 shows a second form of clip;

FIG. 6 shows the use of the clip of FIG. 5 in accordance with the present invention;

FIGS. 15a and 15b illustrate the use of a clip to provide a branch-off for an inlet or outlet valve;

FIGS. 18a to 18c show a somewhat similar multi-outlet termination;

FIGS. 26a and 26b show a clip for use with small diameter cables; and

FIGS. 27a to 27c show a clip for use with larger diameter cables.

Figure 1A:
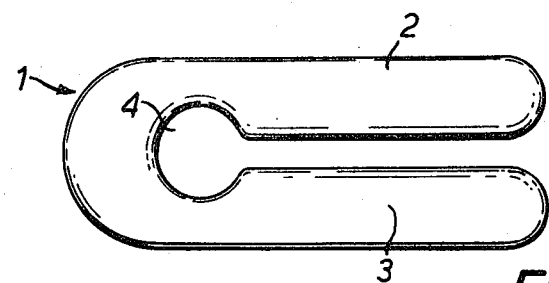
FIGS. 1a and 1b illustrate a clip suitable for use in the present invention.
Figure 1B:
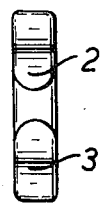

Referring now to the drawings, FIGS. 1a and 1b show aluminium clip 1 for use in the present invention. It will be seen that the width of the legs 2 and 3 is greater than their thickness. In addition, the base of the gap between the legs 2 and 3 has been cut away at 4 for added strength. Typical dimensions for the clip are as follows: length 64 mm; width 24 mm; length of legs 52 mm; width of arms 10 mm; thickness of arms 5 mm; gap between arms 4 mm.

Figure 2:
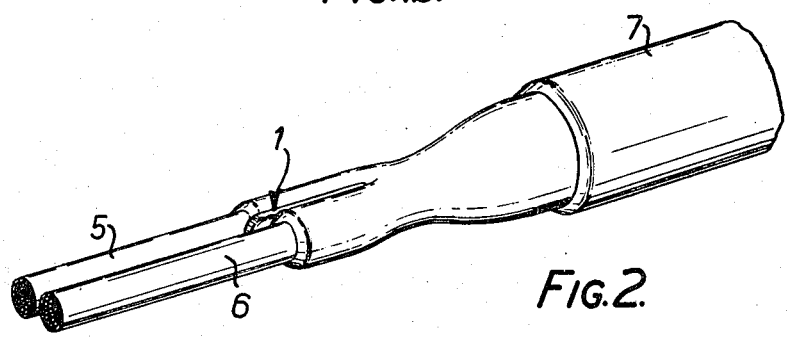
FIG. 2 shows the use of the clip of FIG. 1 in accordance with the present invention.

FIG. 2 shows how the clip 1 may be used to form a branch-off for two telecommunication cables 5 and 6 passing into a splice case 7 of the XAGA-type as described and claimed in British Pat. No. 1,431,167. The assembly is shown after recovery.

Figure 3:
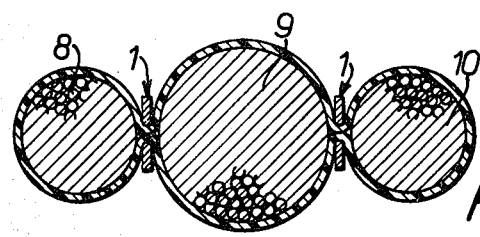
FIG. 3 shows the use of two such clips in accordance with the present invention.

FIG. 3 (which is a section), shows the use of two such clips to form a 3-way branch-off on a similar product. The clips 1 operate to space the cables 8, 9 and 10 apart and at the same time, ensure that the cables are separated by hot-melt adhesive. This is the most important if the cables are to be kept separate during subsequent flexing and bending. This has been a problem with the mastic tape method, where the mastic has become squeezed out and created leakage paths between the cable surfaces.

FIG. 4 shows the application of a single clip 1 to a duct seal 11 of the type described and claimed in German Offenlegungsschrift No. 2,748,894. As can be seen, the duct seal is arranged to conduct multi-wire cables 12 and 13 through a duct (not shown) and is provided with external flanges 14 for the sealant 15 positioned between them. On heating these flanges 14 to deform and the sealant 15 melts and flows so as to seal the device within the duct.

In FIG. 5 there is shown an aluminum clip 16, which is provided with three legs 17, 18 and 19, which are arranged symmetrically about the longitudinal access of the clip. The legs are in other respects similar to those of the clip 1 of FIG. 1 and, once again, a portion of the clip has been cut away at the base of the gaps between the arms for added strength.

FIG. 6 shows how the clip 16 may be used to form a 3-way branch-off at the end of a XAGA splice case 20. As can be seen, one of the branch-off conduits 21 so formed has been caused partially to shrink about a reinforcing coil and has been provided with an end cap 23 in accordance with German Offenlegungsschrift No. 2,748,383. The end cap 23 can be removed when it becomes necessary to use the feed-through device 22.

Figure 7:
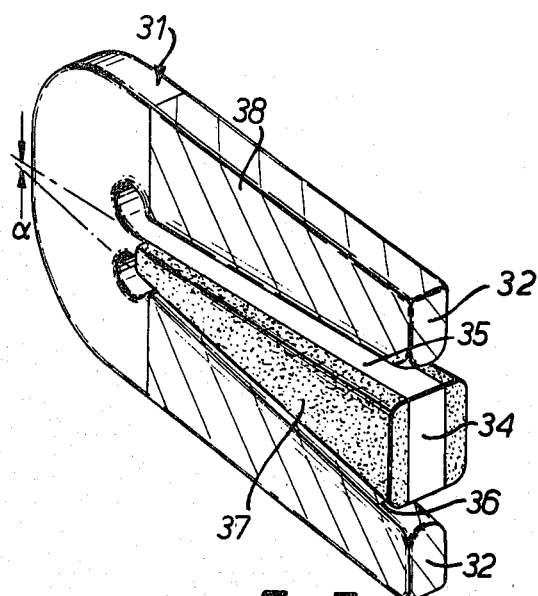
FIG. 7 shows a preferred form of trident clip in accordance with the present invention.

In FIG. 7 there is shown a trident clip 31 according to the present invention. The inner surfaces of the outer legs 32 and 33 and the surfaces of the central leg 34 are tapered so as to define an angle α. The surfaces of the outer legs and the central leg run substantially parallel to form two sloping channels 35 and 36, each of which is cut away at the bottom for increased strength by stress distribution.

The central leg 34 is provided on each side with a hot-melt coating 37 and the surfaces of the outer legs are provided with a coating 38 of a thermochromic indicator.

Typical dimensions for the clip are as follows: thickness, 5 mm; width of central leg, 11 mm decreasing to 5.5 mm; gap between legs, 1 to 2 mm according to sleeve material wall thickness.

Figure 8:
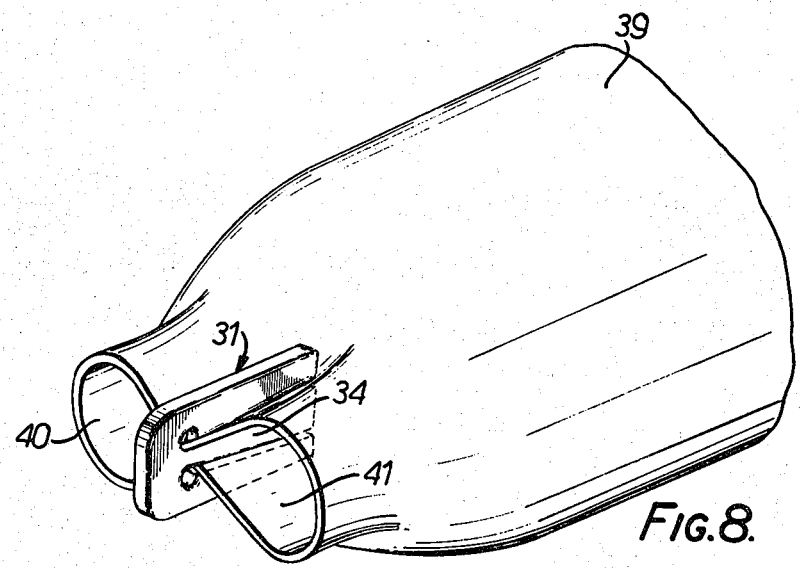
FIG. 8 shows the use of the trident clip in forming a branch-off.

FIG. 8 shows the clip 31 in position on a heat-shrinkable sleeve 39 to form two branch-off conduits 40 and 41. As can be seen, in the recovered position, the central leg 34 forms a separating barrier between the conduits.

Figure 9A:
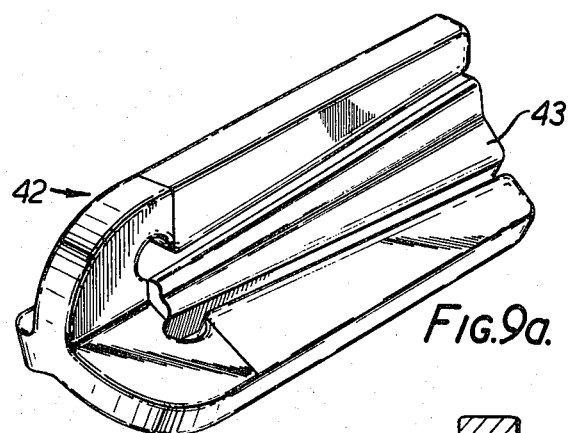
FIGS. 9a and 9b show a modified trident clip designed to form a 3-way branch-off.
Figure 9B:
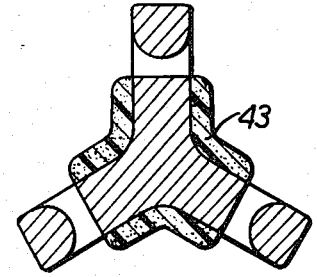

FIGS. 9a and 9b show an adapted trident clip 42 designed to form a three-way branch-off, the central leg 43 being formed as a part of Y-shaped cross-section.

Figure 10:
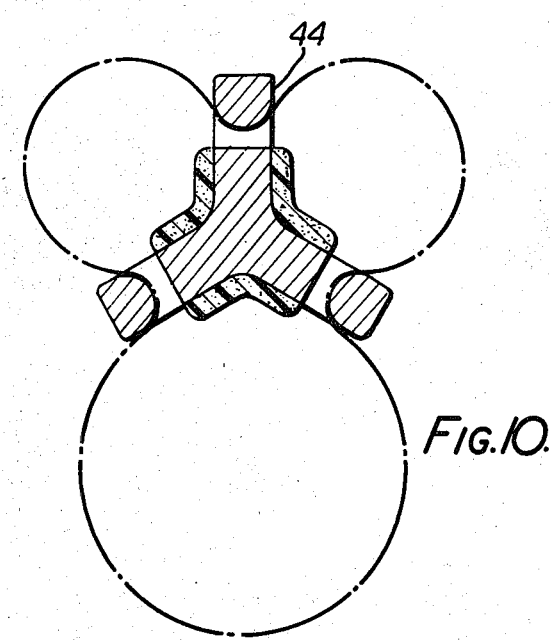
FIG. 10 illustrates a further modification for forming an asymmetric branch-off.
Figure 11:
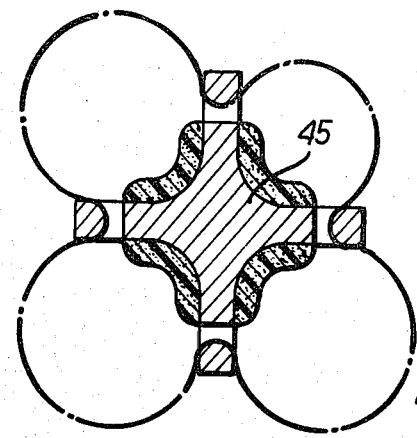
FIG. 11 illustrates a clip for forming a 4-way branch-off.
Figure 12:
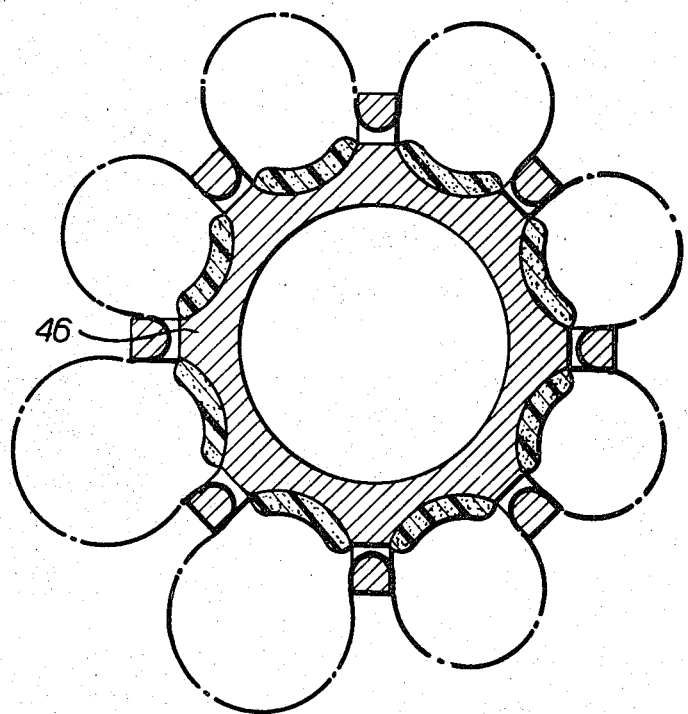
FIG. 12 illustrates a clip forming an 8-way branch-off.

FIGS. 10, 11 and 12 show various clips 44, 45 and 46, respectively, for forming other multi-outlet branch-offs.

Figure 13A:
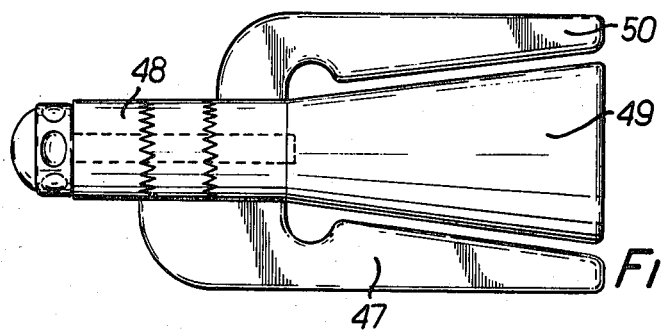
FIGS. 13a and 13b illustrate an adaptable clip for forming a 3-way branch-off.
Figure 13B:
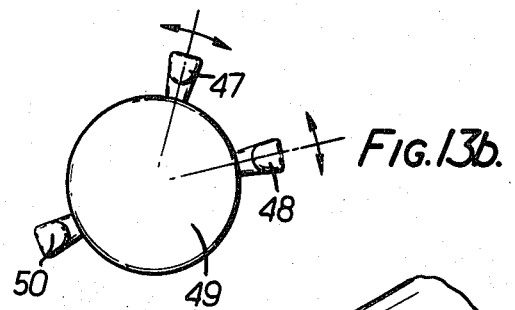

FIGS. 13a and 13b show an adjustable three-way branch-off clip. In this clip two of the outer legs 47 and 48 are rotatably mountable on an extended part of the inner leg 49, whereas outer leg 50 is fixed to said inner leg 49. Such a clip can be adjusted according to the nature of the branch-off required.

Figure 14A:
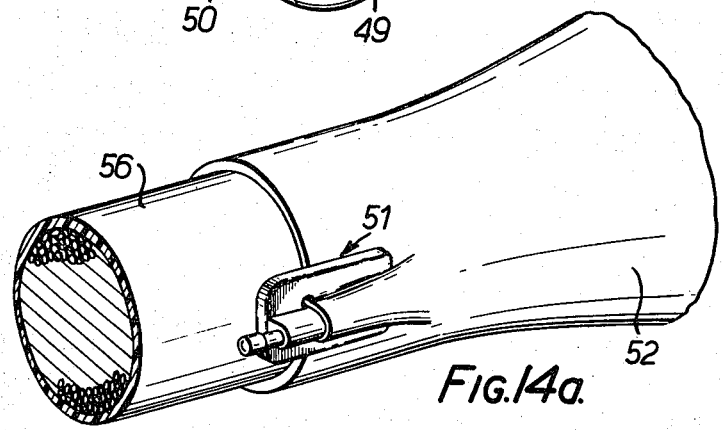
FIGS. 14a and 14b illustrates a clip which can act as an inlet valve.
Figure 14B:
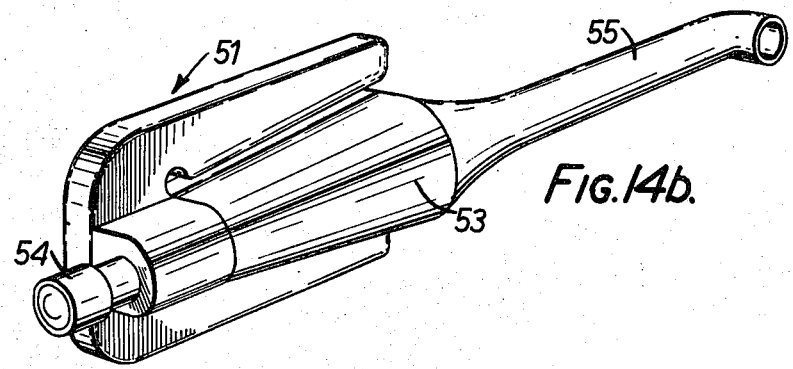

In FIG. 14a there is shown the use of a trident clip 51 to provide an inlet for pressurised air within a cable splice 52. In this embodiment, as shown in FIG. 14b, the central leg 53 of the trident clip 51 is hollow and is provided with a valve 54 and an inlet duct 55. The central leg 53 of the clip 51 acts as a substrate in the branch-off from cable 56.

In FIG. 15a there is shown how two trident clips 57 and 58 may be employed with a wrap-around splice 59 to form a branch-off inet and outlet at the ends thereof. In this case the inlet and outlet are provided with separate devices 60 and 61 (as shown in FIG. 15b) which form the substrates in the branch-off from cables 61 and 63, respectively.

Figure 16A:
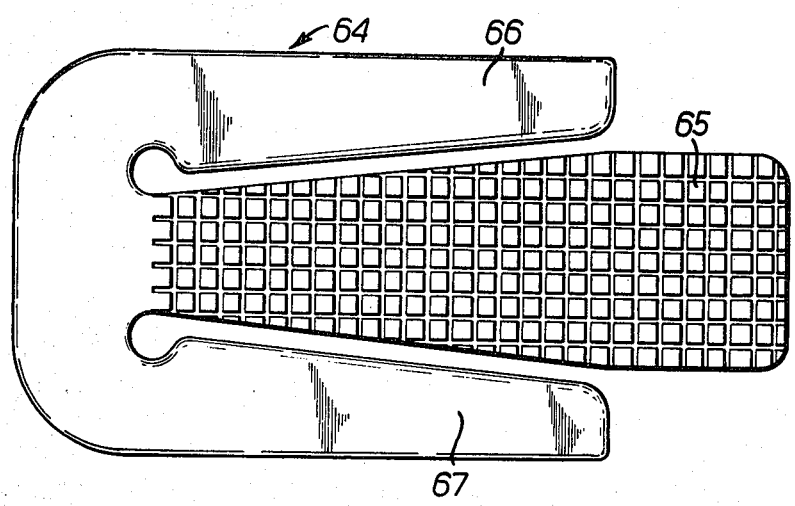
FIGS. 16a and 16b show a preferred form of trident clip.
Figure 16B:
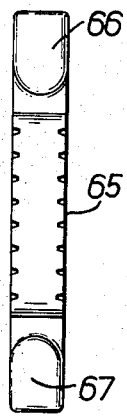

FIGS. 16a and 16b show a further form of preferred trident clip 64 in accordance with the present invention. This clip 64 has the preferred features that the central leg 65 extends beyond the ends of the outer legs 66 and 67 and that the side surfaces of the central leg 65 are waffled to provide a suitable base for adhesive, as discussed previously.

Finally, in FIGS. 17a to 17e there is shown how the present invention may be employed to form branch outlets from a heat-recoverable sleeve and a further co-operating component.

Figure 17A:
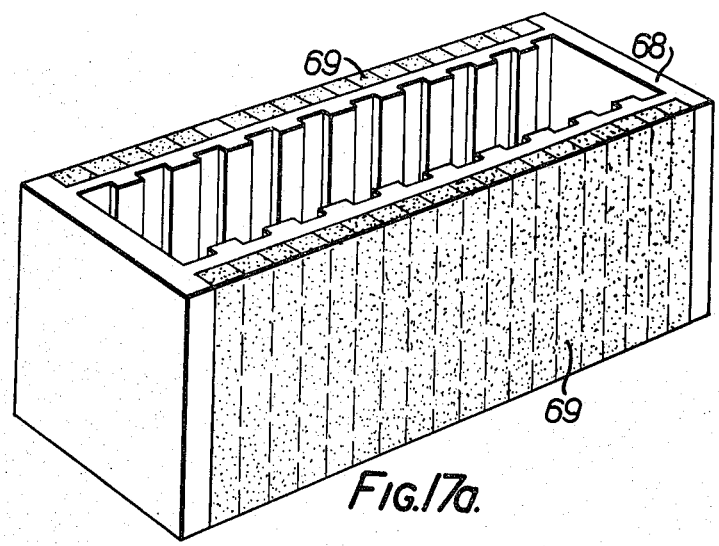
FIGS. 17a to 17e show the use of a further form of clip in conjunction with a heat-recoverable sleeve and a distribution box to form a multi-outlet termination.

In FIG. 17a there is shown a distribution box 63 provided on its external surfaces with hot-melt adhesive 69. This distribution box is designed to distribute pairs of cables from a large incoming cable to a large number of outgoing smaller cables.

Figure 17B:
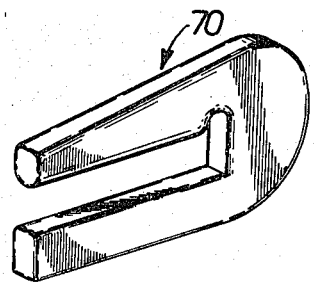
Figure 17C:
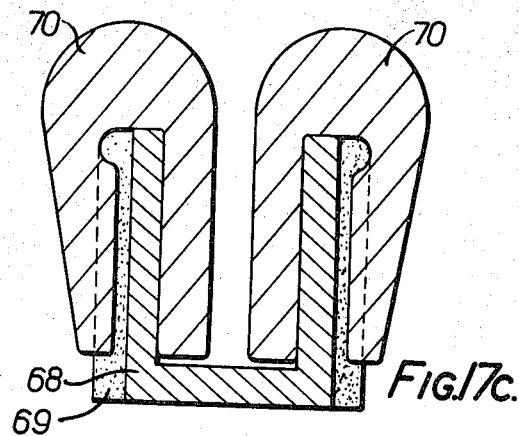
Figure 17D:
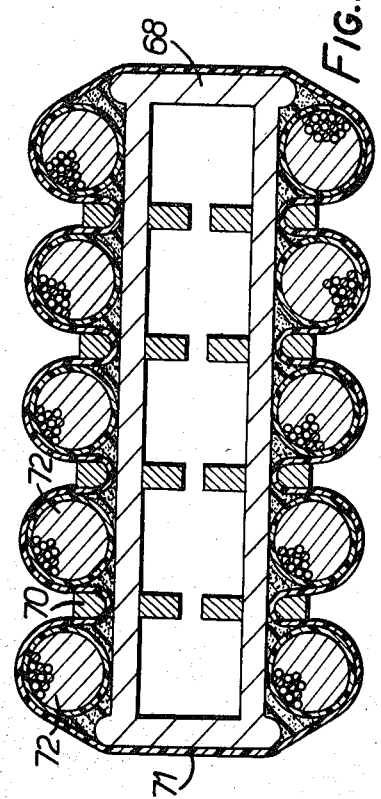
Figure 17E:
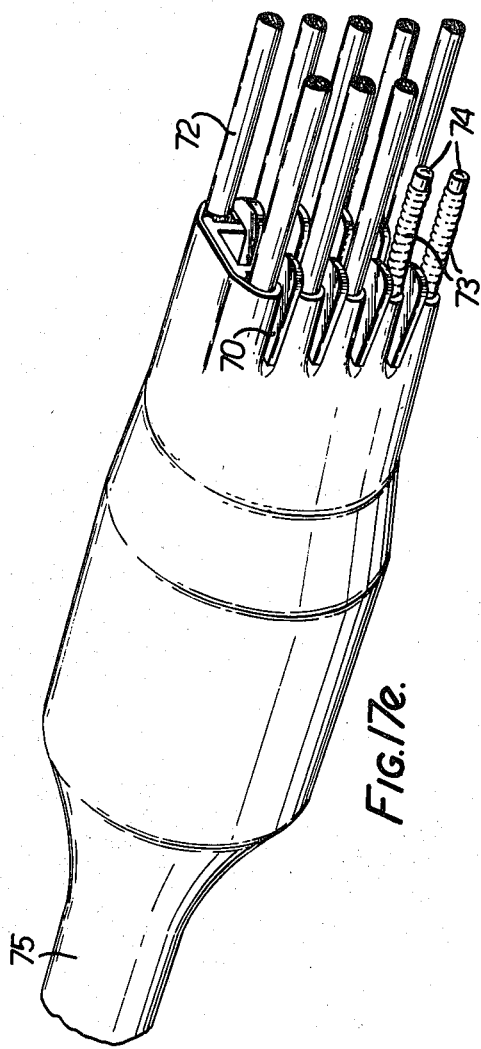

In accordance with the present invention the adhesive coatings 69 are pre-cut to remove strips which are slightly wider than the thickness of the clips 70 (as shown in FIG. 17b). The box 68 is then inserted within a large diameter heat-recoverable sleeve 71 and the outgoing cables 72 are arranged around the surface of the distribution box 68. As is shown in FIGS. 17c and 17d the clips 70 are then positioned between the cables 72 and over the external surface of the heat-recoverable sleeve 71 and the internal surface of the distribution box 68. The assembly so produced may then be heated to cause recovery of sleeve 71 and flow of the adhesive 69 to produce the completed distribution box shown in FIG. 17e. As indicated, some of the branch-offs may be occupied by devices 73 provided with caps 74 for future use.

The distribution box 68, preferably made from a strong thermally conductive metal, may be provided with grooves on its internal surface to assist location of the clips. The heat-recoverable sleeve 71 may, of course, be a wrap-around sleeve and may be internally coated to reduce water vapour penetration. At its other end it is shrunk about the large incoming cable 75.

The box 68 may have different geometries such as circular, elliptical, star-shape etc. and various different forms of clip 70 may be used.

FIGS. 18a to 18c show a somewhat similar multi-outlet branch-off arrangement for use with a pressurized splice case. As shown in FIG. 18a the splice case 80, which may be formed from two metal half shells, is protected and insulated by a wrap-around heat-shrinkable sleeve 81 provided with a conventional fastening means 82. Ingoing cable 83 is to be spliced to form four outlet cables 84 and, in accordance with the invention, a seal is formed at the inlet using a trident clip 85 which provides a conduit for a pressure valve 86. The seal at the inlet is formed as described previously. At the outlet there is provided a heat-shrinkable cap 87 which has a hot melt adhesive coating on its external surface. As shown, the cap is provided with four trident clips 88 in accordance with the present invention. The cap 87 and the clips 88 co-operate with the outlet end of heat-shrinkable sleeve 81 and the arrangement before recovery is shown in FIG. 18b. It will be seen that the cap, the sleeves and the clips between them form four conduits for the outgoing cables 84. When the assembly shown in FIG. 18b is complete the heat-recoverable sleeve 81 is caused to shrink by using a conventional torch and the heat-shrinkable cap 87 is preferably caused to shrink by means of a so-called "hot pack", i.e. a pyrotechnic type heating device, which is pre-installed within it. The recovered assembly is shown in FIG. 18c.

Such an arrangement is especially useful in the formation of multi-outlet branch-offs from pressurized splice cases where the expansion rate of the heat-recoverable sleeve is kept as low as possible, usually at about 1.3 in order to keep the wall thickness of the sleeve to a maximum and to reduce unresolved recovery to a minimum, thereby obviating the rupture of the sleeve under pressure.

Figure 19:
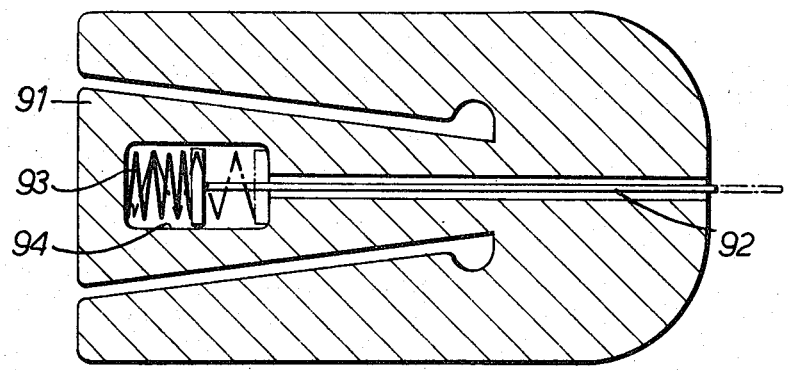
FIG. 19 shows a clip provided with a temperature indication device.

In FIG. 19 there is shown a trident clip, the central leg 91 of which is provided with a temperature indication device which comprises an indicator rod 92 positioned within the leg 91 and a load spring 93 which is held in compression within chamber 94 by being embedded in a thermofusible material (not shown). When the desired temperature is reached the thermofusible material melts and the spring 91 recovers resiliently to move the rod 92 to the position shown by the dotted lines, thus indicating that the desired temperature has been reached.

Figure 20A:
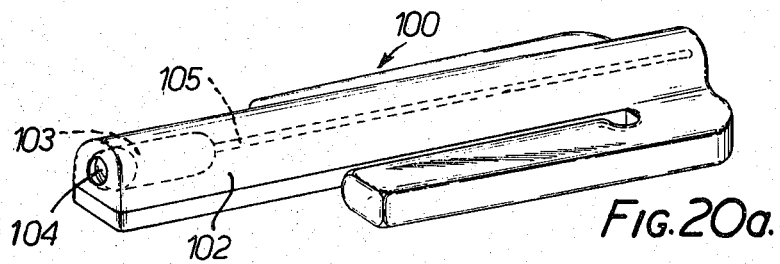
FIGS. 20a to 20c show a clip provided with a combined pressure and temperature indication device.
Figure 20B:
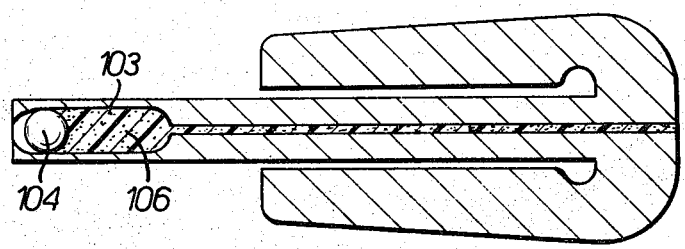
Figure 20C:
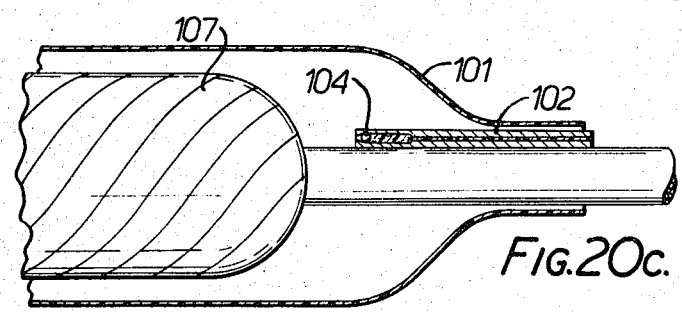

FIGS. 20a to 20c show a clip 100 which is provided with means for indicating that both a desired temperature and a desired pressure have been attained within heat-shrinkable sleeve 101. As shown in FIGS. 20b the central leg 102 of clip 100 is provided with a chamber 103 in which is positioned a ball valve 104. Also positioned within chamber 103 and in a channel 105 which connects the chamber to the closed end of the clip 100 is a thermofusible material 106.

The positioning of the clip 100 within a pressurized splice case joint 107 is shown in FIG. 20c. When the desired temperature is reached the thermofusible material 106 melts and, provided that a correct seal is achieved, the pressure within the joint 107 causes the ball valve 104 to move along the chamber 103 thereby forcing a volume of molten thermofusible material out from the end of the clip, the volume extruded being approximately equal to the volume originally positioned in chamber 103. The operator can thus be sure not only that has the correct temperature been reached but also that there are no leaks in the seal formed at the joint.

Figure 21A:
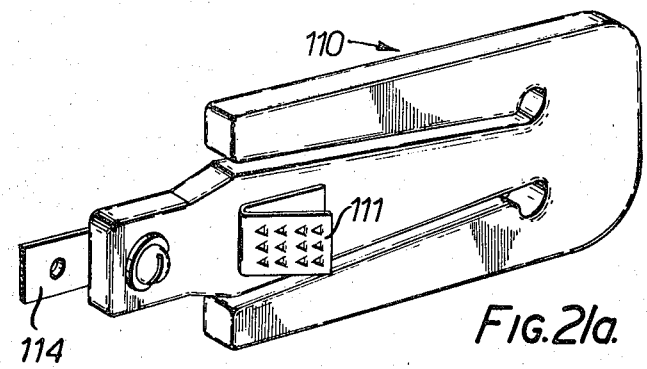
FIGS. 21a to 21c illustrate the use of a clip provided with means for facilitating electrical continuity.
Figure 21B:
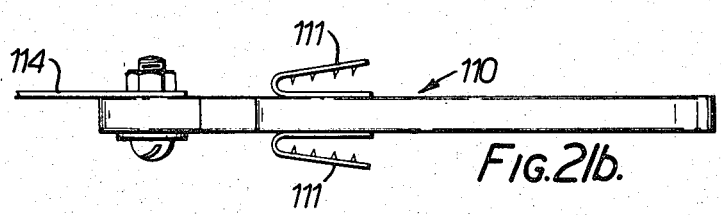
Figure 21C:
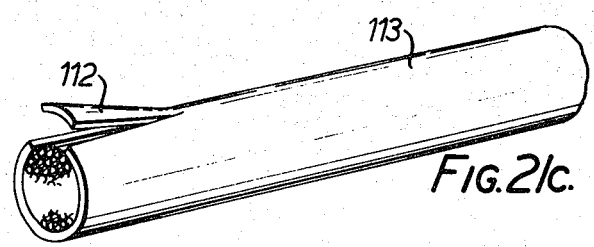

FIGS. 21a to 21c show a trident clip 110, the central leg of which is provided on each side with jaw members 111. These are designed to accommodate and grip strips 112 cut from the aluminium shielding foil of telecommunication cables 113, as shown in FIGS. 21c, and thus ensure electrical continuity between the cables 113 and electrical bond line 114 which is attached to the central leg of clip 110.

Figure 22A:
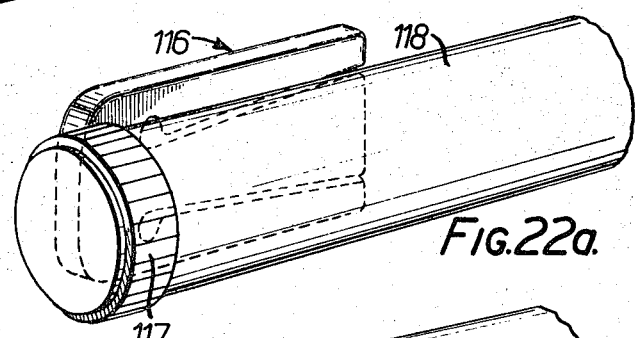
FIGS. 22a and 22b show a clip suitable for use with a pressure transducer.
Figure 22B:
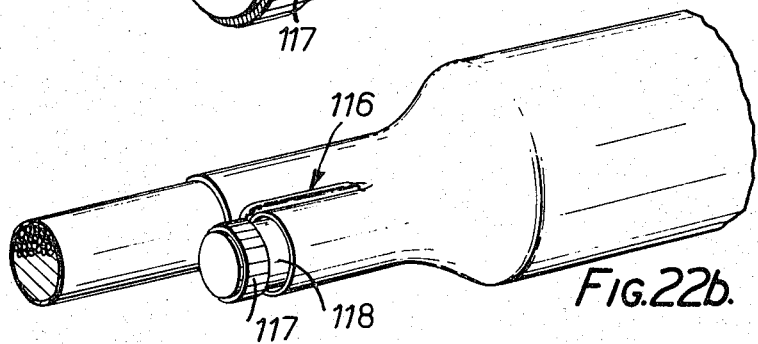

FIGS. 22a and 22b show a further form of clip 116 and its use in the formation of a joint at the end of a pressurized splice case provided with a pressure transducer. As shown, the clip 116 is provided with a locating ring 117 which is designed to fit around the pressure transducer container 118. If desired, the ring 117 could be formed as a cap for the container 118.

Figure 23A:
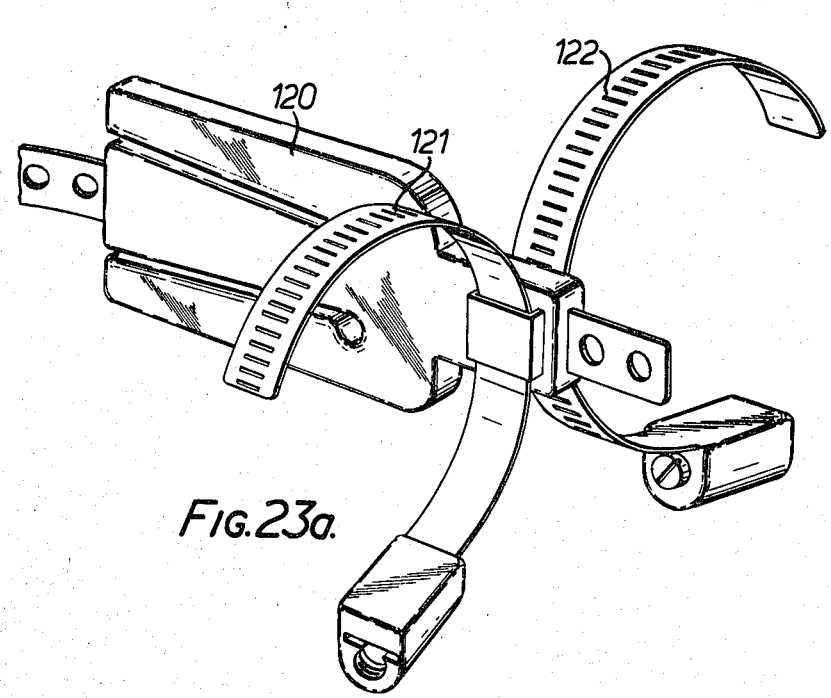
FIGS. 23a and 23b show a clip designed to provide strain relief to a formed joint.
Figure 23B:
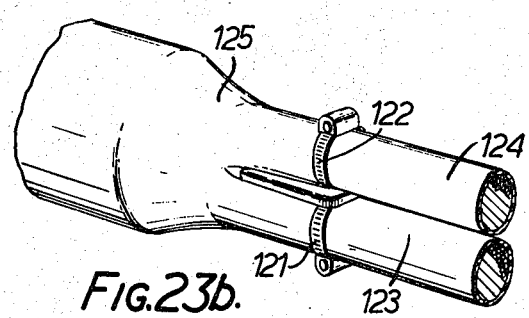

FIGS. 23a and 23b show trident clip 120 which is provided with two straps 121 and 122 which are designed to be fastened around cables 123 and 124, respectively, as they leave a splice joint 125. This arrangement not only serves properly to locate the cables and the clip at the joint, but also provides strain relief to the system and ensures that movement of the cables externally of the joint does not cause damage. It is, therefore, especially appropriate for use with heavy duty cables or service pipes, etc.

Figure 24A:
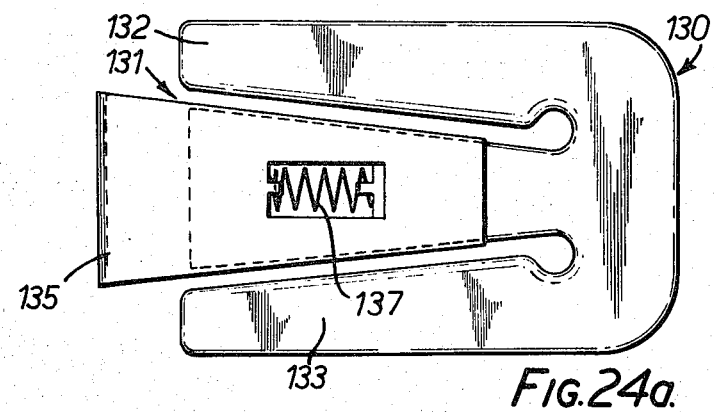
FIGS. 24a and 24b show a self-adjusting clip for use in the present invention.
Figure 24B:
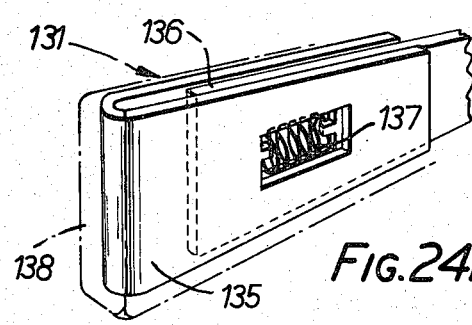

In FIGS. 24a and 24b there is shown clip 130 which is designed so as to be self-adjusting in that the gaps between the central leg 131 of the external legs 132 and 133 may vary according to the thickness of the heat-recoverable sleeve. For this purpose the central leg 131 is constructed from two parts, a U-shaped member 135 being slidably mounted on a central member 136 and, initially, held in an extended position against the force of a tension spring 137, the whole assembly being embedded in a hot-melt adhesive 138 to prevent recovery of the tension spring. When, in operation, clip 130 is heated the hot-melt adhesive 138 fuses and the tension spring recovers causing the U-shaped member 135 to move along the central member 136 towards the base of the clip, as shown by the dotted lines. In doing so the gap between the legs is reduced, thereby ensuring that the heat-recoverable sleeve material positioned therein is firmly gripped.

Figure 25:
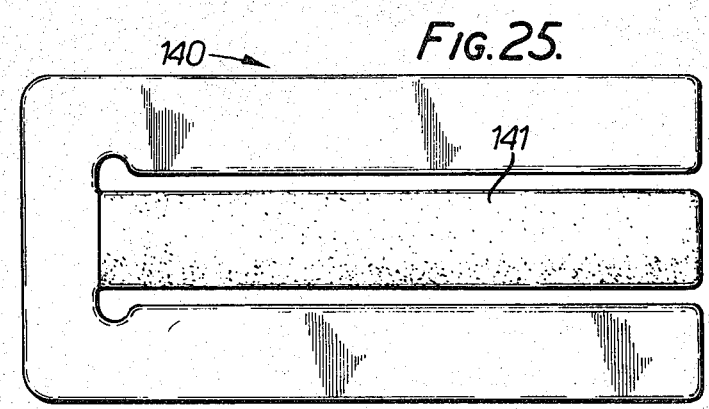
FIG. 25 shows a further form of clip for use with a pressurized splice case joint.

FIG. 25 shows a further form of clip 140 for use with pressurized splice cases. As shown this clip 140 has three legs of equal length which will in general, be longer than the clip shown, for example, FIG. 5. In addition, the width of the central leg 141 is constant throughout its length and is kept as small as practicable, e.g. at about 5 mm, in order to facilitate the formation of a good seal between the heat-recoverable sleeve and the cables in the vicinity of the clip. Both sides of central leg 141 are provided with a layer of a hot-melt adhesive.

Finally, in FIGS. 26 and 27 there are shown two other advantageous clips for use in the present invention. The clip shown in FIG. 26 is designed for use with cables of outside diameter from about 8 to about 35 mm. As can be seen most clearly from FIG. 26c, which is a section taken near the open of the clip, the sides of central leg 151 are concave in nature to accommodate the cables. In addition the upper and lower surfaces of the hot-melt adhesive layer 152 are each provided with two longitudinally extending ribs 153. As mentioned earlier, the provision of these ribs enhances the push-fit of the clip over the sleeve prior to shrinkage.

The clip shown in FIG. 27 is designed for larger cables of outside diameter greater than about 30 mm. In this clip the central leg 161 decreases in thickness from the closed end to the open end of the clip in order to accommodate the cables. Once again, hot-melt adhesive layer 162 is provided with longitudinal ribs 163 to enhance the positioning of the clip prior to recovery but in this case the ribs 163 extend over only a part of the length of central leg 161 in order to allow facile initial installation of the clip.

Other modifications and variations falling within the scope of the present invention will be apparent to those skilled in the art.

I claim:

1. An assembly comprising a heat-shrinkable sleeve capable of being positioned around at least first and second elongate substrates, and a clip having at least two elongate legs capable of being positioned over the outer surface of the sleeve at the end thereof so as to form, and maintain during subsequent heat shrinkage of the sleeve, at least two terminal conduits respectively capable of receiving the first and second substrates, the distance between the legs when a two-legged said clip is used being substantially equal to the double thickness of the sleeve encompassed by the legs when so-positioned.

2. An assembly comprising a heat-shrinkable sleeve capable of being positioned around at least first and second elongate substrates, and a clip having two elongate legs capable of being positioned over the outer surface of the sleeve at the end thereof, so as to form, and maintain during subsequent heat shrinkage of the sleeve, two terminal conduits respectively capable of receiving the first and second substrates, the distance between the legs of the clip being substantially equal to the double thickness of the sleeve encompassed by the legs when so-positioned.

3. An assembly comprising a heat-shrinkable sleeve capable of being positioned around at least first and second elongate substrates, and a clip formed as a trident, the outer legs of which are capable of being positioned over the outer surface of the sleeve at the end thereof, with the central leg of the trident inside the sleeve, so as to form, and maintain during subsequent heat-shrinkage of the sleeve, at least two terminal conduits respectively capable of receiving the first and second substrates.

4. An assembly according to claim 1, 2 or 3, wherein the sleeve is an integral tubular sleeve.

5. An assembly according to claim 1, 2 or 3, wherein the sleeve is a wraparound sleeve.

6. An assembly according to claim 1, 2 or 3, assembled to form the conduits by the clip pinching together two layers of the sleeve.

7. An assembly according to claim 1 or 3, assembled to form the conduits by the clip pinching a layer of the sleeve to another substrate.

8. An assembly according to claim 1 or 2, assembled to form the conduits by the clip pinching a layer of the sleeve to a distribution box.

9. An assembly according to claim 1 or 2, assembled to form the conduits by the clip pinching a layer of the sleeve to another heat-recoverable component.

10. An assembly according to claim 1, 2 or 3, wherein the clip is provided with means for indicating that a desired temperature has been reached during heat shrinking of the sleeve.

11. An assembly according to claim 1, 2 or 3, wherein the clip is provided with a thermochromic indicator for indicating that a desired temperature has been reached during heat shrinking of the sleeve.

12. An assembly according to claim 1, 2 or 3, wherein the clip is provided with a temperature indication device comprising a thermo fusible material which, when it melts, enables an indicator element to move and signify the attainment of a desired temperature.

13. An assembly according to claim 1, 2 or 3, wherein the clip is provided with means for indicating that a desired pressure level has been obtained within the joint formed between the heat-shrinkable sleeve and the first and second substrates.

14. An assembly according to claim 1, 2 or 3, wherein the clip is provided with means for ensuring electrical continuity between the first and second substrates.

15. An assembly according to claim 1, 2 or 3, wherein the clip is provided with means for providing strain relief to the joint formed between the heat-shrinkable sleeve and the substrates.

16. An assembly according to claim 1, 2 or 3, wherein the clip is provided with members which grip at least one substrate externally of the joint formed between the heat-shrinkable sleeve and the substrates to provide strain relief to the joint.

17. An assembly according to claim 1, 2 or 3, wherein part of the clip forms one of the substrates.

18. An assembly according to claim 1 or 3, wherein one clip is assembled with the sleeve to form three or more conduits.

19. An assembly according to claim 1, 2 or 3, wherein two or more clips are assembled with the sleeve to form a multi-outlet branch-off.

20. An assembly according to claim 1, 2 or 3, wherein the clip is provided with means so that it may be adjusted according to the thickness of the heat-shrinkable sleeve.

21. An assembly according to claim 1, 2 or 3, wherein the clip is provided with self-adjusting means for adjusting it according to the thickness of the heat-shrinkable sleeve.

22. An assembly according to claim 1, 2 or 3, wherein the clip is provided with self-adjusting means regulated by a resilient member for adjusting the gap between the legs of the clip to the thickness of the heat-shrinkable sleeve.

23. An assembly according to claim 1, 2 or 3, wherein the clip is provided with self-adjusting means regulated by a resilient member for adjusting the gap between the legs of the clip to suit the thickness of the heat-shrinkable sleeve, the resilient member being initially embedded in a thermo-fusible material so as to render it inoperative prior to heat shrinking of the sleeve.

24. An assembly according to claim 1, 2 or 3, wherein the clip is made from a thermally conductive material.

25. An assembly according to claim 1, 2 or 3, wherein the clip is made from aluminium.

26. An assembly according to claim 1, 2 or 3, wherein the clip is made from steel.

27. An assembly according to claim 1, 2 or 3, wherein the clip is made from a memory alloy and is heat-recoverable to enhance its grip on the sleeve.

28. An assembly according to claim 1, 2 or 3, wherein the clip is made from a preconditioned memory alloy and is heat-recoverable to enhance its grip on the sleeve.

29. An assembly according to claim 1, 2 or 3, wherein the clip is made from a preconditioned β-brass memory alloy and is heat-recoverable to enhance its grip on the sleeve.

30. An assembly according to claim 2, wherein the clip is a U-clip.

31. An assembly according to claim 30, wherein the inner edges of the legs of the clip are serrated or are sinusoidally shaped.

32. An assembly according to claim 3, assembled with the two outer legs of the trident over the outer surface of the sleeve and the central leg of the trident inside the sleeve.

33. An assembly according to claim 3 or 32, wherein the inner edges of the outer legs and the edges of the central leg taper inwardly towards the closed base of the clip.

34. An assembly according to claim 3 or 32, wherein the inner edges of the outer legs and the edges of the central leg lie in a mutually parallel arrangement.

35. An assembly according to claim 3 or 32, wherein the sides of the central leg are concave over at least part of its length.

36. An assembly according to claim 3 or 32, wherein the thickness of the central leg decreases from the open end to the closed end of the clip.

37. An assembly according to claim 3, wherein each side of the central leg of the trident clip is provided with a layer of hot melt adhesive or a sealant.

38. An assembly according to claim 37, wherein the upper surface of the hot melt adhesive or sealant layer is provided over at least part of the length of the central leg with one or more longitudinal ribs.

39. An assembly according to claim 37 or 38, wherein each side of the central leg of the trident clip is roughened or contoured to facilitate bonding of the adhesive or sealant.

40. An assembly according to claim 1, 2 or 3, wherein the clip is substantially rigid.

41. An assembly according to claim 1, 2 or 3, assembled with the substrates in the conduits.

42. An assembly according to claim 1, 2 or 3, assembled with the substrates in the conduits and having the sleeve heat-shrunk around the substrates.

43. A clip formed as a trident, the outer legs of which are capable of being positioned over the outer surface of a heat-shrinkable sleeve at the end thereof, with the central leg of the trident inside the sleeve so as to form, and maintain during subsequent heat shrinkage of the sleeve, at least two terminal conduits respectively capable of receiving, first and second elongate substrates, the sides of the central leg of the trident being provided with a layer of hot melt adhesive or a sealant.

44. A clip according to claim 43, wherein the inner edges of the outer legs and the edges of the central leg taper inwardly towards the closed base of the clip.

45. A clip according to claim 43, wherein the inner edges of the outer legs and the outer edges of the central leg lie in a mutually parallel arrangement.

46. A clip according to claim 43, wherein the sides of the central leg are roughened or contoured to facilitate bonding of the adhesive or sealant.

47. A clip according to claim 43, wherein the sides of the central leg are concave over at least part of its length.

48. A clip according to claim 43, wherein the thickness of the central leg decreases from the open end to the closed end of the clip.

49. A clip according to claim 43, wherein the upper surface of the hot melt adhesive or sealant layer is provided over at least part of the length of the central leg with one or more longitudinal ribs.

50. In an assembly according to claim 1, 2 or 3, wherein the clip is provided with members which locate at least one substrate externally of the joint formed between the heat-shrinkable sleeve and the substrates to provide strain relief to the joint.

51. In an assembly according to claim 37 or 38, wherein the lower surface of the hot melt adhesive or sealant layer is provided over at least part of the length of the central leg with one or more longitudinal ribs.

52. A clip according to claim 43 or 49, wherein the lower surface of the hot melt adhesive or sealant layer is provided over at least part of the length of the central leg with one or more longitudinal ribs.

53. A kit of parts suitable for forming a branch-off between at least two substrates, which comprises a heat-shrinkable sleeve and at least one clip having at least two elongate legs which can be positioned on the heat-shrinkable sleeve at an open end thereof, with each of said legs positioned externally of the sleeve, and the distance between adjacent elongate legs being such that the clip can be slid over the pinched together layers of the heat-recoverable sleeve to form at least two terminal conduits for the substrates.

54. A kit of parts as claimed in claim 53, wherein the clip is a U-clip having two elongate legs.

55. A kit of parts as claimed in claim 53, wherein the clip has three elongate legs arranged symmetrically about the longitudinal axis of the clip.

56. A clip which comprises at least two outer elongate legs and at least one inner elongate leg, at least part of the surface of the inner leg being provided with a heat-activatable adhesive or sealant thereon, the legs being so arranged that the clip can be positioned on the open end of a heat-shrinkable sleeve, with the outer legs outside the sleeve and such an inner leg inside the sleeve, so as to form at least two terminal conduits capable of receiving elongate substrates.

57. A clip as claimed in claim 56, wherein the surface of the inner leg which is provided with the adhesive or sealant is roughened or contoured.

58. A clip as claimed in claim 56, wherein the inner leg is positioned at the central longitudinal axis of the clip.

59. A clip as claimed in claim 58, wherein the outer legs are positioned at the central longitudinal axis of the clip.

60. A clip as claimed in claims 56, 58 or 59, which is formed as a trident, the sides of the central leg of which are provided with a layer of hot-melt adhesive or a sealant.

61. A clip as claimed in claim 60, wherein the inner edges of the outer legs and the outer edges of the central leg taper inwardly towards the closed base of the clip.

62. A clip as claimed in claim 60, wherein the inner edges of the outer legs and the outer edges of the central leg lie in a mutually parallel arrangement.

63. A clip as claimed in claim 60, which is made from flat stock.

64. A clip as claimed in any one of the claims 56 to 59, which comprises at least three outer legs.

65. A clip as claimed in claim 56, which is made from a thermally conductive material.

66. A clip as claimed in claim 65, which is made from aluminum.

67. A clip as claimed in claim 65, which is made from steel or beryllium copper.

68. A clip as claimed in claim 56, which is provided with means for indicating that a desired temperature has been reached.

69. A clip as claimed in claim 68, which is provided with a thermochromic indicator.

70. A clip as claimed in claim 68, comprising a temperature indicating device comprising a thermofusible material which, when it melts, enables an indicator element to move and signify the attainment of the desired temperature.

71. A clip as claimed in claim 56, comprising means for indicating that a desired pressure level has been attained within the joint formed between the heat-shrinkable sleeve and the substrates.

72. A clip as claimed in claim 56, comprising means for ensuring electrical continuity between the substrates.

73. A clip as claimed in claim 56, comprising means for providing strain relief to the joint formed between the heat-shrinkable sleeve and the substrates after recovery of the sleeve.

74. A clip as claimed in claim 73, wherein said means comprises members which grip the substrates externally of the joint.

75. A clip as claimed in claim 56, wherein part of the clip forms one of the substrates.

76. A clip as claimed in claim 56, comprising adjustment means so that the clip can be adjusted according to the thickness of the heat-shrinkable sleeve.

77. A clip as claimed in claim 76, which is self-adjusting.

78. A clip as claimed in claim 77, wherein the gap between the legs of the clip is variable and regulated by a resilient member.

79. A clip as claimed in claim 78, wherein the resilient member is initially embedded in a thermofusible material so as to render it inoperative until the clip is heated.

80. A clip as claimed in claim 73 or 74, wherein said means comprises members which locate the substrates externally of the joint.

81. A clip formed as a trident comprising two outer elongate legs and a central elongate leg, wherein the sides of the central leg are roughened or contoured and are provided with a layer of hot-melt adhesive or sealant, with the inner edges of the outer legs and the outer edges of the central leg tapering inwardly towards the closed base of the clip, the legs being so arranged that the clip can be positioned on the open end of a heat-shrinkable sleeve, with the outer legs outside the sleeve and the central leg inside the sleeve, so as to form at least two terminal conduits capable of receiving elongate substrates.

* * * * *

UNITED STATES PATENT AND TRADEMARK OFFICE
CERTIFICATE OF CORRECTION

PATENT NO. : 4,400,579

DATED : August 23, 1983

INVENTOR(S) : Jean-Marie E. Nolf

It is certified that error appears in the above—identified patent and that said Letters Patent is hereby corrected as shown below:

In the Bibliographic Data, item [30] Foreign Application Priority Data should be added: --January 9, 1978 [GB] United Kingdom 631/78--. In the Abstract, line 6, "as" should be --an--. In the Specification, column 5, line 35, "a" should be --an--. In the Claims, column 17, line 3, "heat-recoverable" should be --heat-shrinkable--; column 14, line 49, claim 12 should be cancelled; column 15, line 49, claim 30 should be cancelled; column 16, lines 4 and 31, claim 44 should be cancelled; column 17, lines 5 and 32, claims 54 and 61 should be cancelled; column 18, lines 3 and 24, claims 70 and 76 should be cancelled. In claim 20, column 15, line 1 "1," should be deleted; in claim 33, column 15, line 59, "3 or" should be deleted; in claim 42, column 16, line 19, "1," should be deleted.

Claims 82-96 should be added as follows:

82. An assembly comprising a heat-shrinkable sleeve capable of being positioned around at least first and second elongate substrates, and a clip having at least two elongate legs capable of being positioned over the outer surface of the sleeve at the end thereof so as to form, and maintain during subsequent heat shrinkage of the sleeve, at least two terminal conduits respectively capable of receiving the first and second substrates, the distance between the legs when a two-legged said clip is used being substantially equal to the double thickness of the sleeve encompassed by the legs when so-positioned, wherein the clip is provided with a temperature indication device comprising a thermo fusible material which, when it melts, enables an indicator element to move and signify the attainment of a desired temperature.

UNITED STATES PATENT AND TRADEMARK OFFICE
CERTIFICATE OF CORRECTION

PATENT NO. : 4,400,579

DATED : August 23, 1983

INVENTOR(S) : Jean-Marie E. Nolf

It is certified that error appears in the above—identified patent and that said Letters Patent is hereby corrected as shown below:

83. An assembly comprising a heat-shrinkable sleeve capable of being positioned around at least first and second elongate substrates, and a clip having two elongate legs capable of being positioned over the outer surface of the sleeve at the end thereof, so as to form, and maintain during subsequent heat shrinkage of the sleeve, two terminal conduits respectively capable of receiving the first and second substrates, the distance between the legs of the clip being substantially equal to the double thickness of the sleeve encompassed by the legs when so-positioned, wherein the clip is provided with a temperature indication device comprising a thermo fusible material which, when it melts, enables an indicator element to move and signify the attainment of a desired temperature.

84. An assembly comprising a heat-shrinkable sleeve capable of being positioned around at least first and second elongate substrates, and a clip formed as a trident, the outer legs of which are capable of being positioned over the outer surface of the sleeve at the end thereof, with the central leg of the trident inside the sleeve, so as to form, and maintain during subsequent heat-shrinkage of the sleeve, at least two terminal conduits respectively capable of receiving the first and second substrates, wherein the clip is provided with a temperature indication device comprising a thermo fusible material which, when it melts, enables an indicator element to move and signify the attainment of a desired temperature.

85. An assembly comprising a heat-shrinkable sleeve capable of being positioned around at least first and second elongate substrates, and a clip having at least two

UNITED STATES PATENT AND TRADEMARK OFFICE
CERTIFICATE OF CORRECTION

PATENT NO. : 4,400,579          Page 3 of 7

DATED : August 23, 1983

INVENTOR(S) : Jean-Marie E. Nolf

It is certified that error appears in the above—identified patent and that said Letters Patent is hereby corrected as shown below:

elongate legs capable of being positioned over the outer surface of the sleeve at the end thereof so as to form, and maintain during subsequent heat shrinkage of the sleeve, at least two terminal conduits respectively capable of receiving the first and second substrates, the distance between the legs when a two-legged said clip is used being substantially equal to the double thickness of the sleeve encompassed by the legs when so-positioned, wherein the clip is provided with means so that it may be adjusted according to the thickness of the heat-shrinkable sleeve.

86. An assembly comprising a heat-shrinkable sleeve capable of being positioned around at least first and second elongate substrates, and a clip having two elongate legs capable of being positioned over the outer surface of the sleeve at the end thereof, so as to form, and maintain during subsequent heat shrinkage of the sleeve, two terminal conduits respectively capable of receivig the first and second substrates, the distance between the legs of the clip being substantially equal to the double thickness of the sleeve encompassed by the legs when so-positioned, wherein the clip is a U-clip.

87. An assembly comprising a heat-shrinkable sleeve capable of being positioned around at least first and second elongate substrates, and a clip formed as a trident, the outer legs of which are capable of being positioned over the outer surface of the sleeve at the end thereof, with the central leg of the trident inside the sleeve, so as to form, and maintain during subsequent heat-shrinkage of the sleeve, at least two terminal conduits respectively capable of receiving the first and second substrates, wherein the inner edges of the outer legs and the edges of

UNITED STATES PATENT AND TRADEMARK OFFICE
CERTIFICATE OF CORRECTION

PATENT NO. : 4,400,579

DATED : August 23, 1983

INVENTOR(S) : Jean-Marie E. Nolf

Page 4 of 7

It is certified that error appears in the above—identified patent and that said Letters Patent is hereby corrected as shown below:

the central leg taper inwardly towards the closed base of the clip.

88. An assembly comprising a heat-shrinkable sleeve capable of being positioned around at least first and second elongate substrates, and a clip formed as a trident, the outer legs of which are capable of being positioned over the outer surface of the sleeve at the end thereof, with the central leg of the trident inside the sleeve, so as to form, and maintain during subsequent heat-shrinkage of the sleeve, at least two terminal conduits respectively capable of receiving the first and second substrates, wherein each side of the central leg of the trident clip is provided with a layer of hot melt adhesive or a sealant.

89. An assembly comprising a heat-shrinkable sleeve capable of being positioned around at least first and second elongate substrates, and a clip having at least two elongate legs of which are capable of being positioned over the outer surface of the sleeve at the end thereof so as to form, and maintain during subsequent heat shrinkage of the sleeve, at least two terminal conduits respectively capable of receiving the first and second substrates, the distance between the legs when a two-legged said clip is used being substantially equal to the double thickness of the sleeve encompassed by the legs when so-positioned, the assembly having the substrates in the conduits with the sleeve heat-shrunk around the substrates.

90. A clip formed as a trident, the outer legs of which are capable of being positioned over the outer surface of a heat-shrinkable sleeve at the end thereof, with the central leg of the trident inside the sleeve so as

UNITED STATES PATENT AND TRADEMARK OFFICE
CERTIFICATE OF CORRECTION

PATENT NO. : 4,400,579

DATED : August 23, 1983

INVENTOR(S) : Jean-Marie E. Nolf

It is certified that error appears in the above—identified patent and that said Letters Patent is hereby corrected as shown below:

to form, and maintain during subsequent heat shrinkage of the sleeve, at least two terminal conduits respectively capable of receiving, first and second elongate substrates, the sides of the central leg of the trident being provided with a layer of hot melt adhesive or a sealant, wherein the inner edges of the outer legs and the edges of the central leg taper inwardly towards the closed base of the clip.

91. A kit of parts suitable for forming a branch-off between at least two substrates, which comprises a heat-shrinkable sleeve and at least one U-clip having two elongate legs which can be positioned on the heat-shrinkable sleeve at an open end thereof, with each of said legs positioned externally of the sleeve, and the distance between adjacent elongate legs being such that the clip can be slid over the pinched together layers of the heat-recoverable sleeve to form at least two terminal conduits for the substrates.

92. A clip which comprises two outer elongate legs and a central elongate leg, the clip being in the form of a trident, the sides of the central leg being provided with a layer of hot-melt adhesive or sealant thereon, wherein the inner edges of the outer legs and the outer edges of the central leg taper inwardly towards the closed base of the clip, the legs being so arranged that the clip can be positioned on the open end of a heat-shrinkable sleeve, with the outer legs outside the sleeve and the central leg inside the sleeve, so as to form at least two terminal conduits capable of receiving elongate substrates.

93. A clip which comprises two outer elongage legs and a central elongate leg positioned at the central

UNITED STATES PATENT AND TRADEMARK OFFICE
CERTIFICATE OF CORRECTION

PATENT NO. : 4,400,579

DATED : August 23, 1983

INVENTOR(S) : Jean-Marie E. Nolf

It is certified that error appears in the above—identified patent and that said Letters Patent is hereby corrected as shown below:

longitudinal axis of the clip, the clip being in the form of a trident, the sides of the central leg being provided with a layer of hot-melt adhesive or sealant thereon, wherein the inner edges of the outer legs and the outer edges of the central leg taper inwardly towards the closed base of the clip, the legs being so arranged that the clip can be positioned on the open end of a heat-shrinkable sleeve, with the outer legs outside the sleeve and the central leg inside the sleeve, so as to form at least two terminal conduits capable of receiving elongate substrates.

94. A clip which comprises two outer elongate legs and a central elongate leg, the clip being in the form of a trident with the central leg and the outer legs positioned at the central longitudinal axis of the clip, the sides of the central leg being provided with a layer of hot-melt adhesive or sealant thereon, wherein the inner edges of the outer legs and the outer edges of the central leg taper inwardly towards the closed base of the clip, the legs being so arranged that the clip can be positioned on the open end of a heat-shrinkable sleeve, with the outer legs outside the sleeve and the central leg inside the sleeve, so as to form at least two terminal conduits capable of receiving elongate substrates.

95. A clip which comprises at least two outer elongate legs and at least one inner elongate leg, at least part of the surface of the inner leg being provided with a heat-activatable adhesive or sealant thereon, the legs being so arranged that the clip can be positioned on the open end of a heat-shrinkable sleeve, with the outer legs outside the sleeve and such an inner leg inside the sleeve, so as to form at least two terminal conduits capable of

UNITED STATES PATENT AND TRADEMARK OFFICE
CERTIFICATE OF CORRECTION

PATENT NO. : 4,400,579

DATED : August 23, 1983

INVENTOR(S) : Jean-Marie E. Nolf

It is certified that error appears in the above-identified patent and that said Letters Patent are hereby corrected as shown below:

receiving elongate substrates, wherein the clip is provided with means for indicating that a desired temperature has been reached comprising a thermofusible material which, when it melts, enables an indicator element to move and signify the attainment of the desired temperature.

96. A clip which comprises at least two outer elongate legs and at least one inner elongate leg, at least part of the surface of the inner leg being provided with a heat-activatable adhesive or sealant thereon, the legs being so arranged that the clip can be positioned on the open end of a heat-shrinkable sleeve, with the outer legs outside the sleeve and such an inner leg inside the sleeve, so as to form at least two terminal conduits capable of receiving elongate substrates, the clip comprising adjustment means so that the clip can be adjusted according to the thickness of the heat-shrinkable sleeve.

Signed and Sealed this

Ninth Day of July 1985

[SEAL]

Attest:

DONALD J. QUIGG

Attesting Officer

Acting Commissioner of Patents and Trademarks